(12) United States Patent
Kobayashi et al.

(10) Patent No.: US 12,444,403 B2
(45) Date of Patent: Oct. 14, 2025

(54) CHANNEL SELECTION APPARATUS, CHANNEL SELECTION METHOD, AND PROGRAM

(71) Applicant: NTT, INC., Tokyo (JP)

(72) Inventors: Kazunori Kobayashi, Tokyo (JP); Shoichiro Saito, Tokyo (JP); Hiroaki Ito, Tokyo (JP)

(73) Assignee: NTT, INC., Tokyo (JP)

( * ) Notice: Subject to any disclaimer, the term of this patent is extended or adjusted under 35 U.S.C. 154(b) by 841 days.

(21) Appl. No.: 17/274,394

(22) PCT Filed: Aug. 28, 2019

(86) PCT No.: PCT/JP2019/033608
§ 371 (c)(1),
(2) Date: Mar. 8, 2021

(87) PCT Pub. No.: WO2020/054405
PCT Pub. Date: Mar. 19, 2020

(65) Prior Publication Data
US 2022/0051657 A1    Feb. 17, 2022

(30) Foreign Application Priority Data
Sep. 11, 2018  (JP) ................................. 2018-169551

(51) Int. Cl.
*G10L 15/05* (2013.01)
*G10L 15/08* (2006.01)
(Continued)

(52) U.S. Cl.
CPC ............ *G10L 15/05* (2013.01); *G10L 15/083* (2013.01); *G10L 21/0272* (2013.01); *G10L 25/78* (2013.01); *G10L 2015/088* (2013.01)

(58) Field of Classification Search
CPC ....... G01L 5/05; G01L 5/083; G10L 21/0272; G10L 25/78
See application file for complete search history.

(56) References Cited

U.S. PATENT DOCUMENTS 9,318,107 B1    4/2016  Sharifi
9,734,822 B1 *  8/2017  Sundaram ............... G10L 15/08
(Continued)

FOREIGN PATENT DOCUMENTS

JP   2017072857 A      4/2017
KR   20100082239 A  *  7/2010  ......... G10L 21/0208
(Continued)

OTHER PUBLICATIONS

Sensory, Inc., "TrulyHandsfreeTM", [online], [searched on Aug. 17, 2018], the Internet <URL: http://www.sensory.co.ip/product/thf.htm> with translation generated by machine.

*Primary Examiner* — Paras D Shah
*Assistant Examiner* — Fouzia Hye Solaiman (57) ABSTRACT

A channel in which an utterance of a keyword is included is selected from acoustic signals of multiple channels. An addition unit 11 adds all channels of input voice signals of multiple channels to generate a composite voice signal of one channel. A keyword detection unit 12 generates a keyword detection result indicating a result of detecting an utterance of a predetermined keyword from a composite voice signal. A power calculation unit 13 calculates powers of channels based on input voice signals. A delay unit 14 delays the powers of the channels. When the keyword detection result indicates that the keyword was detected, a maximum power detection unit 15 selects, as an output channel, a channel having the maximum power among the powers of the channels of the input voice signals. A channel selection unit 16 selects the voice signal of the output
(Continued)

channel from the input voice signals and outputs the selected voice signal.

5 Claims, 8 Drawing Sheets

(51) Int. Cl.
*G10L 21/0272* (2013.01)
*G10L 25/78* (2013.01)

(56) References Cited

U.S. PATENT DOCUMENTS

| | | | |
|---|---|---|---|
| 10,388,273 B2 * | 8/2019 | Garner | G10L 15/08 |
| 2019/0073999 A1 * | 3/2019 | Prémont | G10L 15/32 |
| 2022/0051657 A1 | 2/2022 | Kobayashi et al. | |

FOREIGN PATENT DOCUMENTS

| | | | | |
|---|---|---|---|---|
| WO | WO-2018053465 A1 * | 3/2018 | | G06F 3/167 |
| WO | WO-2018078885 A1 * | 5/2018 | | G10L 15/22 |
| WO | 2020/054405 A1 | 3/2020 | | |

\* cited by examiner

CHANNEL SELECTION APPARATUS, CHANNEL SELECTION METHOD, AND PROGRAM

CROSS-REFERENCE TO RELATED APPLICATIONS

This application is a U.S. 371 Application of International Patent Application No. PCT/JP2019/033608, filed on 28 Aug. 2019, which application claims priority to and the benefit of JP Application No. 2018-169551, filed on 11 Sep. 2018, the disclosures of which are hereby incorporated herein by reference in their entireties.

TECHNICAL FIELD

The present invention relates to a technique for selecting a channel in which an utterance of a keyword is included from acoustic signals of multiple channels.

BACKGROUND ART

An apparatus that can be controlled by voice, such as a smart speaker or an on-board system, may be equipped with a function called "keyword wakeup", which starts speech recognition upon a keyword that serves as a trigger being uttered. Such a function requires a technique for detecting the utterance of a keyword from an input voice signal.

Figure 1:
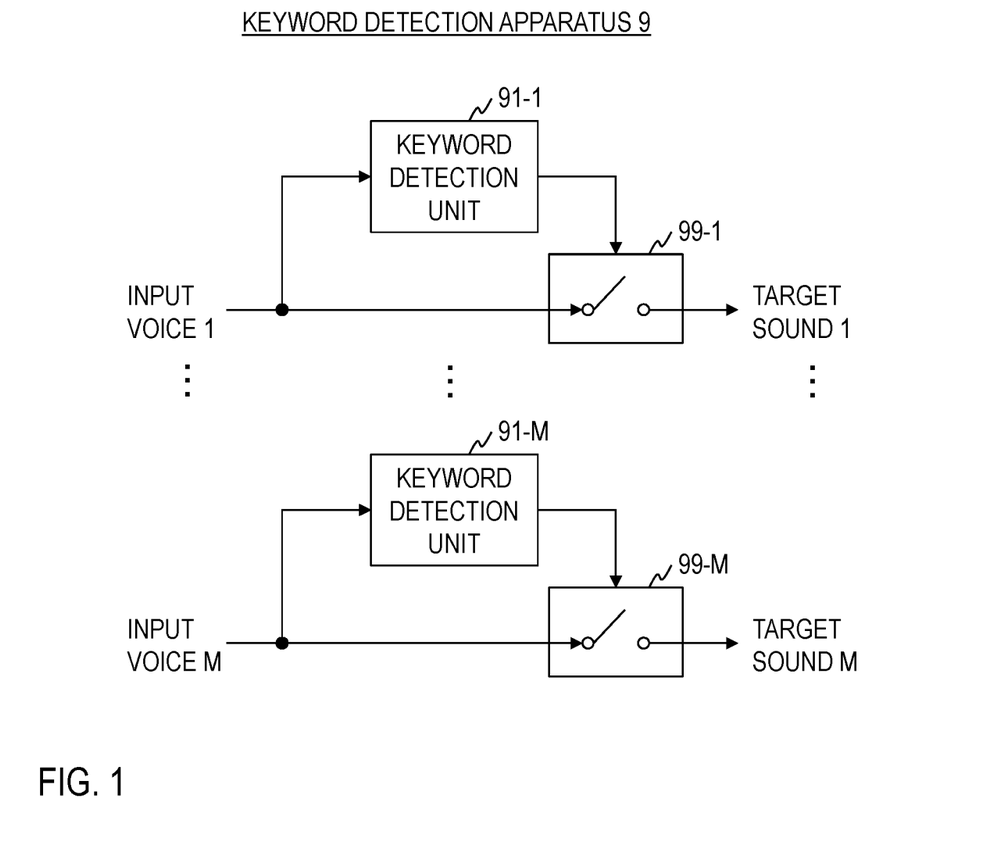
FIG. 1 is a diagram illustrating an exemplary functional configuration of a conventional keyword detection apparatus.

FIG. 1 shows a configuration according to a conventional technique disclosed in Non-Patent Literature 1 According to the conventional technique, upon a keyword detection unit 91 detecting the utterance of a keyword from an input voice signal, a target sound output unit 99 turns a switch on, and outputs the voice signal as a target sound that is to be subjected to speech recognition or the like. If the input voice is in multiple channels, the channels in which the keyword is included can be selected from among the multiple channels as long as a number of sets of keyword detection units 91 and target sound output units 99 that is the same as the number of channels are prepared as shown in FIG. 1. For example, if the above-described processing is carried out using acoustic signals collected by multiple microphones installed in a room as input, it is possible to find out which microphone the keyword was uttered near, and it is possible to perform specification of the utterance position and speech recognition using the keyword as a trigger.

CITATION LIST

Non-Patent Literature

Non-Patent Literature 1: Sensory, Inc., "Truly-Handsfree™", [online] [searched for on Aug. 17, 2018], Internet <URI: http://www.sensory.co.jp/product/thf.htm>

SUMMARY OF THE INVENTION

Technical Problem

However, in the conventional technique, keyword detection processing corresponding to the number of channels is needed, and the computation amount increases significantly. Also, in the case of using multiple microphones installed in the same room, a case is envisioned in which the same keyword utterance is collected by multiple microphones, and the keyword is included in multiple channels. In this case, although the microphone that is the closest to the keyword utterance location is to be selected, all the multiple channels in which an utterance of the keyword was detected are selected in the conventional technique.

In view of the above-described technical problem, an object of the invention is to suitably select, with a small computation amount, a channel in which an utterance of the keyword is included from an acoustic signal of multiple channels.

Means for Solving the Problem

In order to solve the above-described problems, a channel selection apparatus according to a first aspect of the invention includes: an addition unit configured to add all channels of input voice signals of a plurality of channels to generate a composite voice signal of one channel; a keyword detection unit configured to generate a keyword detection result indicating a result of detecting an utterance of a predetermined keyword from the composite voice signal; a power calculation unit configured to calculate power of each channel based on the input voice signals; and a maximum power detection unit configured to, when the keyword detection result indicates that a keyword has been detected, select a channel having the maximum power among the powers of the channels of the input voice signals as an output channel.

In order to solve the above-described problems, a channel selection apparatus according to a second aspect of the invention includes: a power calculation unit configured to calculate power of each channel based on input voice signals of M channels, where N is an integer that is 3 or more; a candidate selection unit configured to select, as candidate channels, K channels with large powers among the channels of the input voice signals, where K is an integer that is 1 or more and less than N; a keyword detection unit configured to generate a keyword detection result indicating a result of detecting an utterance of a predetermined keyword based on the voice signals of the candidate channels; and a maximum power detection unit configured to select, as an output channel, a channel having the maximum power among the powers of the candidate channels for which the keyword detection result indicates that a keyword has been detected.

Effects of the Invention

According to the invention, a channel in which an utterance of a keyword is included can be suitably selected with a small computation amount from an acoustic signal of multiple channels.

DESCRIPTION OF EMBODIMENTS

Hereinafter, embodiments of the invention will be described in detail. Note that constituent portions having the same function are denoted by the same numbers in the drawings, and redundant description thereof is omitted.

First Embodiment

Figure 2:
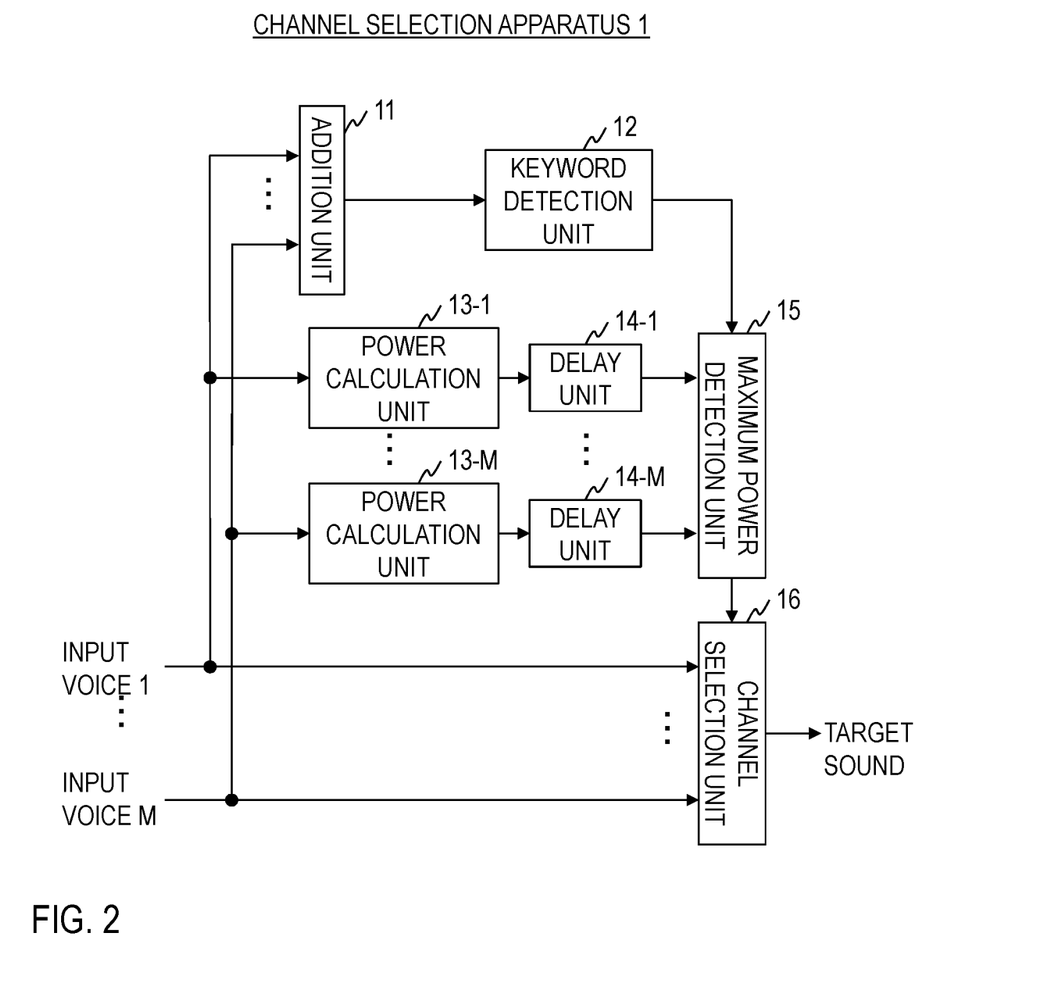
FIG. 2 is a diagram illustrating an exemplary functional configuration of a channel selection apparatus according to a first embodiment.

A channel selection apparatus 1 according to a first embodiment uses voice signals of multiple channels (hereinafter referred to as "input voice signals") as input, selects a voice signal of a channel that is suitable for a target sound that is a target of speech recognition or the like among channels in which an utterance of a keyword was detected, and outputs the selected voice signal. As shown in FIG. 2, the channel selection apparatus 1 includes an addition unit 11, a keyword detection unit 12, M power calculation units 13-1, . . . , and 13-M, M delay units 14-1, . . . , and 14-M, a maximum power detection unit 15, and a channel selection unit 16, Note that M is the number of channels of the input voice signals, and is an integer that is 2 or more. The channel selection apparatus 1 realizes a channel selection method S1 of the first embodiment by performing processing of the steps shown in FIG. 3.

The channel selection apparatus 1 is, for example, a special apparatus that is configured by loading a special program to a known or dedicated computer including a central processing unit (CPU), a random-access memory (RAM), and the like. The channel selection apparatus 1 executes the steps of processing based on, for example, control performed by the central processing unit. The data input to the channel selection apparatus 1 and the data obtained in the steps of processing are stored, for example, in the random-access memory, and the data stored in the random-access memory is used in other processing by being read out to the central processing unit as needed. At least a portion of the processing units of the channel selection apparatus 1 may also be constituted by hardware such as an integrated circuit.

Figure 3:
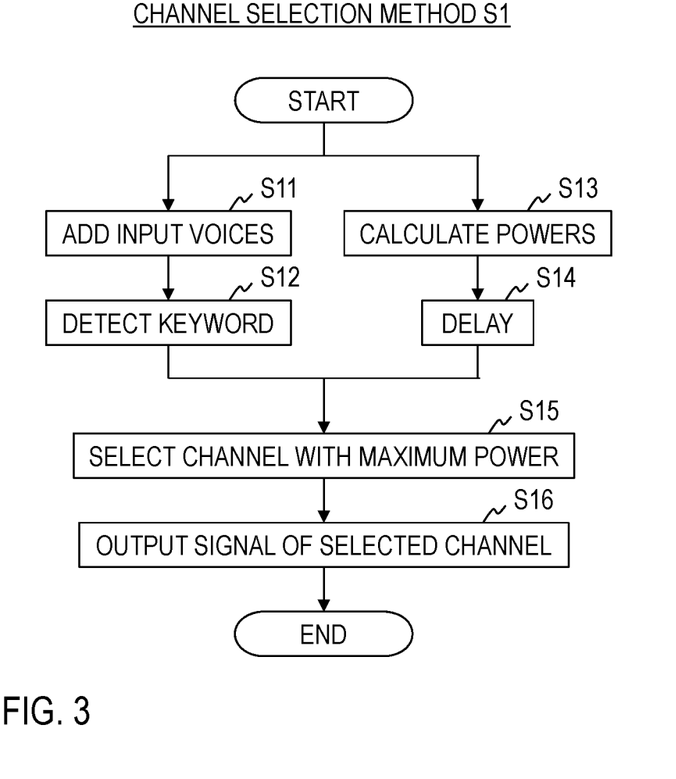
FIG. 3 is a diagram illustrating an exemplary processing procedure of a channel selection method according to the first embodiment.

Hereinafter, with reference to FIG. 3, a channel selection method executed by the channel selection apparatus of the first embodiment will be described.

In step S11, the addition unit 11 adds all the channels of the input voice signals of N channels (hereinafter referred to as "input voice signals") to generate a voice signal of one channel (hereinafter referred to as "composite voice signal"). The addition unit 11 outputs the composite voice signal to the keyword detection unit 12.

In step S12, the keyword detection unit 12 uses the composite voice signal output by the addition unit 11 as input and detects the utterance of a predetermined keyword from the composite voice signal. The detection of the keyword is performed by determining whether or not, for example, a pattern of a power spectrum obtained in periods of a short amount of time is similar to a pattern of a keyword recorded in advance, using a neural network that was learned in advance. Instead of using audio of the keyword, it is also possible to use an action that produces sound, such as whistling or clapping. The keyword detection unit 12 outputs, to the maximum power detection unit 15, a keyword detection result indicating that the keyword was detected, or that the keyword was not detected.

In step S13, a power calculation unit 13-$i$ ($i=1, \ldots,$ and M) calculates the power of the i-th channel (hereinafter called "channel i") of the input voice signal. The power calculation unit 13-$i$ outputs the power of the channel i to the delay unit 14-$i$. In the calculation of the power, a root mean square power multiplied by a rectangular window of an average keyword utterance time T, and a root mean square multiplied by an exponential window are calculated. Letting Pi(t) be the power of the channel i at a discrete time t and xi(t) be the input signal, following formulae are set.

$$Pi(t) = \frac{1}{T}\sum_{n=t-T}^{t} xi(t)^2$$

$$Pi(t) = \alpha Pi(t-1) + (1-\alpha)xi(t)^2$$

Note that $\alpha$ is a forgetting factor, and a value that satisfies $0<\alpha<1$ is set in advance. $\alpha$ is set so that the time constant is an average keyword utterance time T (sample). That is to say, $\alpha=1-1/T$ is satisfied. Alternatively, an absolute value average power multiplied by a rectangular window of the keyword utterance time T or an absolute value average power multiplied by an exponential window may be calculated as expressed by the following formulae.

$$Pi(t) = \frac{1}{T}\sum_{n=t-T}^{t} |xi(t)|$$

$$Pi(t) = \alpha Pi(t-1) + (1-\alpha)|xi(t)|$$

The power calculated by the power calculation unit 13-$i$ may also be obtained by subtracting a noise level. The noise level can be obtained using an average value or a dip hold value of the signal power over a long amount of time. Dip hold processing for holding the lowest value of the calculated power Pi(t) is performed, and a steady noise power Ni(t) is obtained. This calculation can be realized by, for example, performing average processing using a long time constant when power is increasing, and performing average processing using a short time constant when power is decreasing.

$Ni(t)=\beta Ni(t)+(1-\beta)Pi(t)$ $Pi(t)>Ni(t-1)$ $Ni(t)=\gamma Ni(t)+(1-\gamma)Pi(t)$ $Pi(t)\leq Ni(t-1)$ Note that $\beta<\gamma$ is satisfied, and each has a value that is 0 or more and 1 or less.

The subtraction of the noise level may also be performed using a frequency range. The subtraction of the noise can be performed more accurately by calculating the power and the noise level using the frequency ranges and subtracting each one.

In step S14, the delay unit 14-$i$ ($i=1, \ldots,$ M) delays the power of the channel i output by the power calculation unit 13-$i$ by a time D. The time D sets the time corresponding to the detection delay of keyword detection. The delay unit 14-$i$ outputs the power of the delayed channel i to the maximum power detection unit 15.

In step S15, when the keyword detection result output by the keyword detection unit 12 indicates that the keyword has been detected, the maximum power detection unit 15 selects the channel having the maximum power among the powers of the channels output by the delay unit 14-1, and 14-M as the output channel. The maximum power detection unit 15 outputs information indicating the selected output channel to the channel selection unit 16.

In step S16, the channel selection unit 16 selects the voice signal of the output channel from the input voice signal in accordance with information indicating the output channel output by the maximum power detection unit 15 and outputs the selected voice signal as a target sound.

Figure 4:
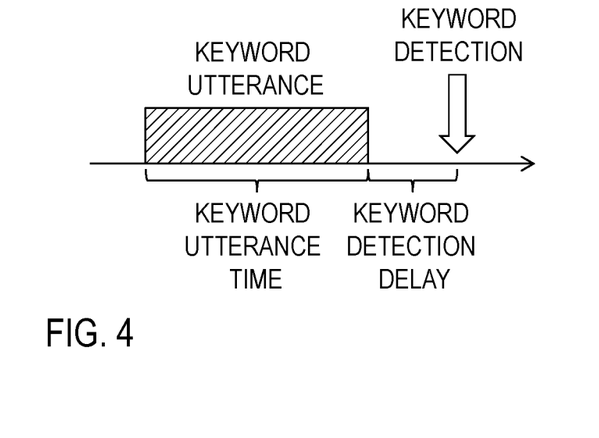
FIG. 4 is a diagram for illustrating a principle of the first embodiment.

Based on the following assumption, if the keyword was detected, the channel selection apparatus 1 of the first embodiment estimates the utterance channel of the keyword by calculating the power corresponding to the keyword utterance segment (see FIG. 4) for each channels. The above-described assumption is the assumption that the power of the signal of the channel in which the keyword is included is the maximum in the keyword utterance segment.

By using this kind of configuration, with the first embodiment, the channel in which the utterance of the keyword is included can be selected from the multiple channels using one keyword detection processing. Also, as with signals of multiple microphones arranged in a room, if the voice component of the keyword utterance is included in multiple channels, the channel with the maximum signal level can be selected.

Second Embodiment

In the first embodiment, keyword detection is performed after all the channels of the input voice signals are added, and therefore if a voice signal of a channel in which there is no keyword utterance is included in addition to the voice signals of the channels in which there is a keyword utterance, the SN ratio of the added composite voice signal deteriorates. For this reason, in the first embodiment, it is envisioned that the accuracy of detecting the keyword will decrease. In the second embodiment, when voice signals of three or more channels are input, voice signals of K channels with a large power are first selected from among the voice signals of the M channels. Also, in the second embodiment, keyword detection is performed on each selected voice signal of the K channels, and the channel with the maximum power among the voice signals in which the keyword was detected is selected as a target sound. In this manner, first, the candidate channels are selected using only the power information and each candidate channel is subjected to keyword detection, and thus it is possible to reduce the number of keyword detection processing while avoiding a decrease in the SN ratio resulting from addition.

Figure 5:
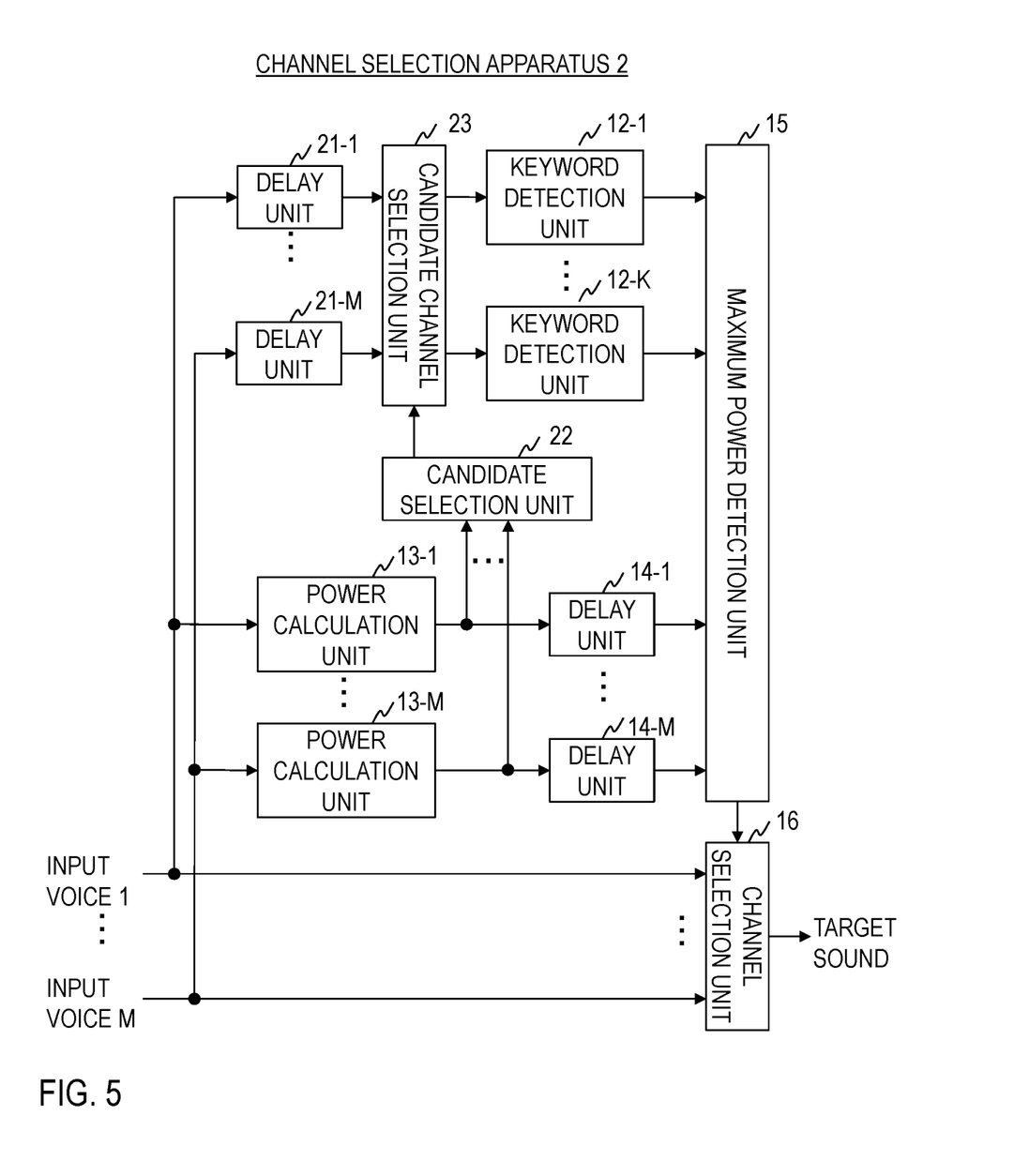
FIG. 5 is a diagram illustrating an exemplary functional configuration of a channel selection apparatus according to a second embodiment.

A channel selection apparatus 2 of the second embodiment uses voice signals of three or more channels as input, selects the voice signals of channels that are suitable for the target sound to be subjected to speech recognition or the like among the channels in which utterance of the keyword was detected, and outputs the selected voice signals. As shown in FIG. 5, in addition to the power calculation units 13-1, . . . , and 13-M, the delay units 14-1, . . . , and 14-M, the maximum power detection unit 15, and the channel selection unit 16 of the first embodiment, the channel selection apparatus 2 further includes K keyword detection units 12-1, . . . , and 12-K, M delay units 21-1, and 21-M, a candidate selection unit 22, and a candidate channel selection unit 23. Here, K is an integer that is 1 or more and less than M, The channel selection apparatus 2 realizes a channel selection method S2 of the second embodiment by performing processing of the steps shown in FIG. 6.

Figure 6:
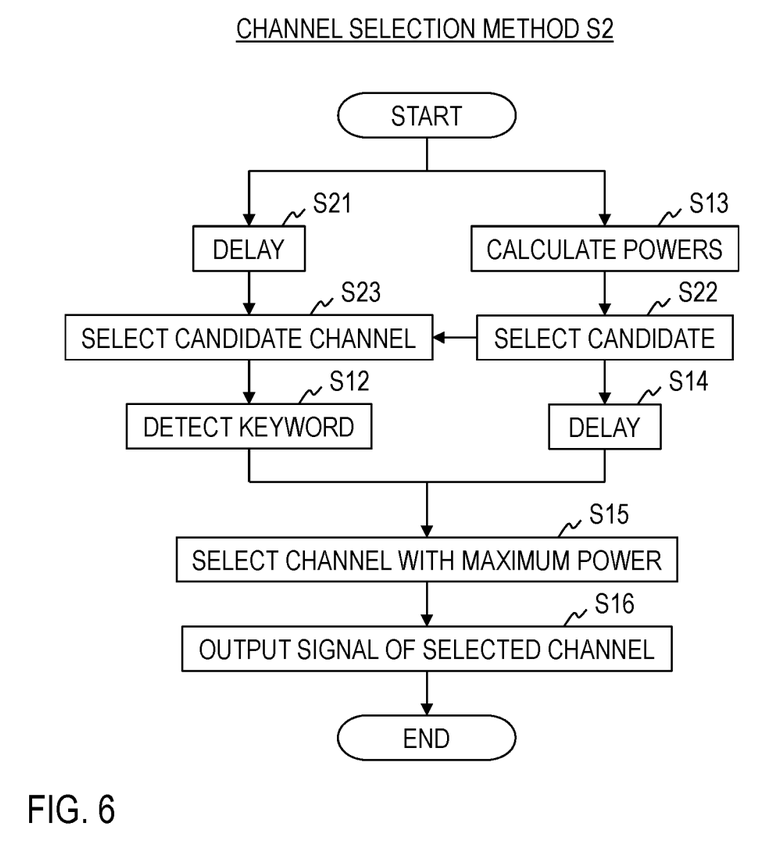
FIG. 6 is a diagram illustrating an exemplary processing procedure of a channel selection method according to the second embodiment.

Hereinafter, with reference to FIG. 6, the channel selection method executed by the channel selection apparatus of the second embodiment will be described, with a focus on differences from the channel selection method of the first embodiment.

In step S21, the delay units 21-$i$ ($i=1, \ldots, M$) delay the voice signal of the channel i of the input voice signal. This is a delay for preventing the subject of the keyword from being lost due to the selection delay resulting from the processing performed by the power calculation unit 13-$i$ and the candidate selection unit 22, and provides a delay of about several hundred milliseconds. The delay unit 21-$i$ outputs the delayed voice signal of the channel i to the candidate channel selection unit 23.

In step S22, the candidate selection unit 22 selects the K channels with large powers among the M channels of the input voice signals as candidate channels based on the power of each channel output by the power calculation units 13-1, . . . , and 13-M. The candidate selection unit 22 outputs information indicating the selected candidate channels to the candidate channel selection unit 23.

In step S23, the candidate channel selection unit 23 selects the voice signal of the candidate channel from the delayed input voice signal output by the delay unit 21-$i$ in accordance with the information indicating the candidate channels output by the candidate selection unit 22. The candidate channel selection unit 23 outputs the voice signal of the j-th ($j=1, \ldots, K$) candidate channel (hereinafter-called "candidate channel j") to the keyword detection unit 12-$j$.

In step S12, the keyword detection unit 12-$j$ uses the voice signal of the candidate channel j output by the candidate channel selection unit 23 as input and detects an utterance of the predetermined keyword from the voice signal. The detection of the keyword need only be performed similarly to the first embodiment. The keyword detection unit 12-$j$ outputs the keyword detection result to the maximum power detection unit 15.

In step S15, when the keyword detection result output by the keyword detection unit 12-$j$ indicates that the keyword was detected, the maximum power detection unit 15 selects, as the output channel, the channel having the maximum power among the outputs of the delay units 14-1, . . . , and 14-M corresponding to the candidate channel j for which it is indicated that a keyword has been detected. The maximum power detection unit 15 outputs information indicating the selected output channel to the channel selection unit 16.

By using this kind of configuration, with the second embodiment, it is possible to select a channel in which an utterance of a keyword is included from multiple channels without incurring a decrease in the SN ratio as a result of adding the voice signals of the channels of the input voice signals.

Third Embodiment

Figure 7:
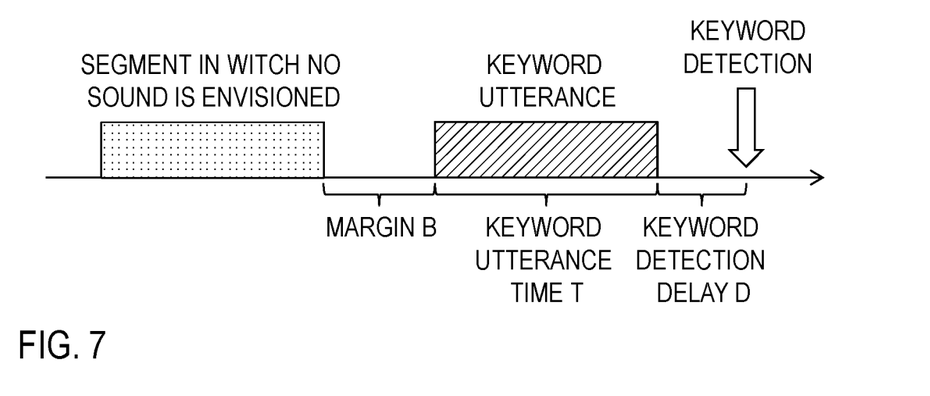
FIG. 7 is a diagram for illustrating a principle of a third embodiment.

In the first embodiment, it was assumed that the power of the channel in which an utterance of the keyword is included is the maximum in the keyword utterance segment. However, this assumption is not necessarily always true. In the third embodiment, the assumption that the utterer has not produced the word prior to the utterance of the keyword is provided in addition to the assumption that the power of the channel in which the utterance of the keyword is included is large in the keyword utterance segment. The utterance of the keyword is thought to always be at the head of an uttered sentence, and therefore it is thought that there is a segment in which there is no utterance of a certain period or more before the keyword utterance (see FIG. 7). In the third embodiment, with a focus on this point, a weight according to which detection is easier is applied to a channel with a small power in the segment before the keyword utterance, and thereafter detection of the channel with the maximum power is performed.

Figure 8:
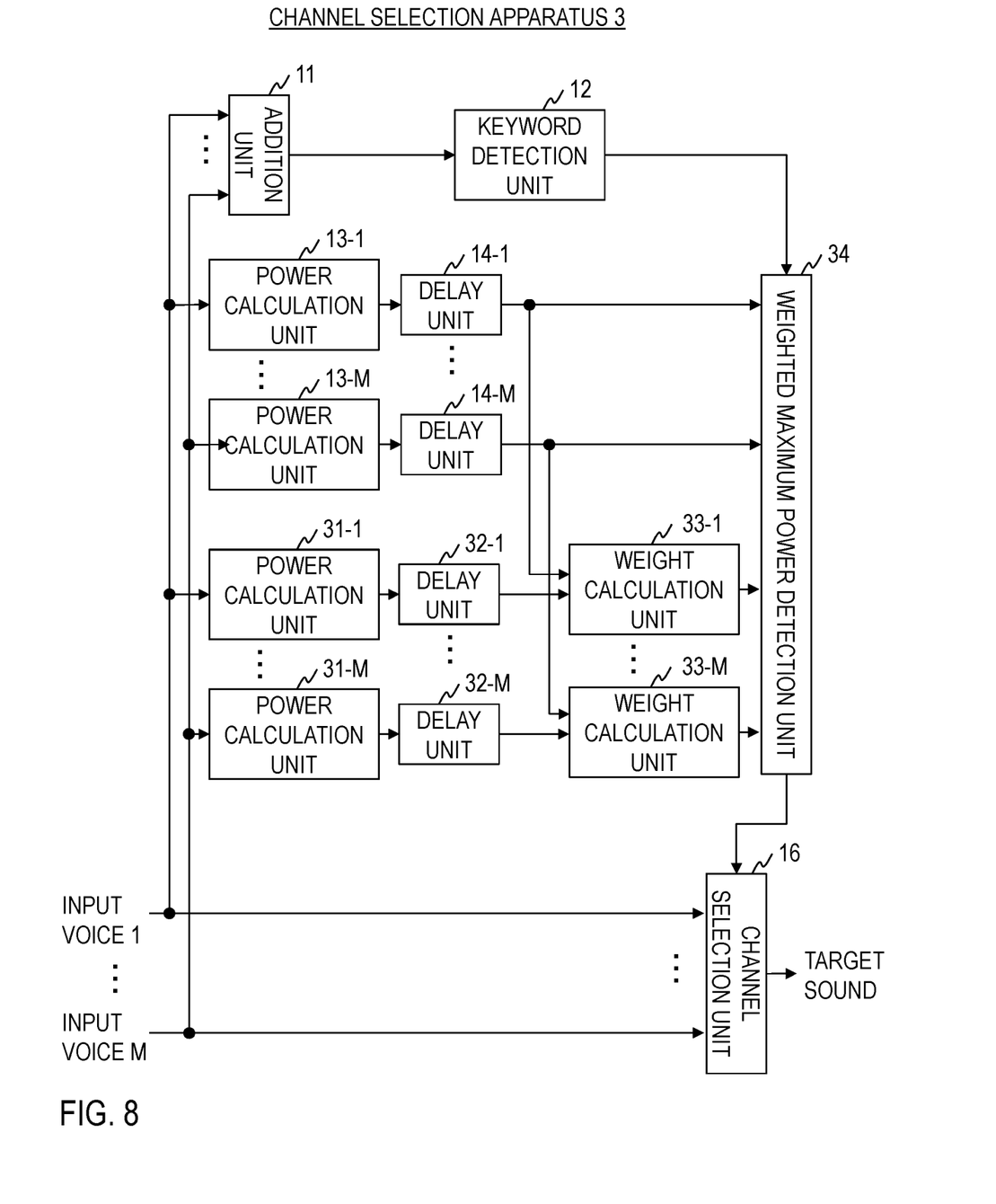
FIG. 8 is a diagram illustrating an exemplary functional configuration of a channel selection apparatus according to the third embodiment.

Similarly to the first embodiment, the channel selection apparatus 3 of the third embodiment uses the voice signals of the multiple channels as input, selects a voice signal of a channel that is suitable for the target sound that is the subject of speech recognition and the like among the channels in which an utterance of the keyword was detected, and outputs the selected voice signal. As shown in FIG. 8, in addition to the addition unit 11, the keyword detection unit 12, the power calculation units 13-1, . . . , and 13-M, the delay units 14-1, . . . , and 14-M, and the channel selection unit 16 of the first embodiment, the channel selection apparatus 3 further includes M power calculation units 31-1, . . . , and 31-M, M delay units 32-1, . . . , and 32-M, M weight calculation units 33-1, . . . , and 33-M, and a weighted maximum power detection unit 34.

Hereinafter, a channel selection method executed by the channel selection apparatus of the third embodiment will be described with a focus on differences from the channel selection method of the first embodiment.

The power calculation unit 31-$i$ ($i=1, \ldots, M$) calculates the power of the channel i of the input voice signals. The power calculation unit 31-$i$ outputs the power of the channel i to the delay unit 32-$i$. In the calculation of the power, a root mean square power multiplied by a rectangular window and a root mean square power multiplied by an exponential window are calculated, where the rectangular window has a predetermined length A of non-sound segment that is envisioned to exist before the keyword utterance. A detailed procedure of power calculation is similar to that of the first embodiment. For example, one second is set in advance as the length A of the envisioned non-sound segment.

The delay unit 32-$i$ ($i=1, \ldots, M$) delays the power of the channel i output by the power calculation unit 31-$i$. The delay amount is a value obtained by adding together a detection delay time of keyword detection D, an average keyword utterance time T, and a margin time B (See FIG. 7). The delay unit 32-$i$ outputs the power of the delayed channel i to the weight calculation unit 33-$i$.

The weight calculation unit 33-$i$ ($i=1, \ldots, M$) calculates the weight based on the output of the delay unit 14-$i$ and the output of the delay unit 32-$i$. The output of the delay unit 14-$i$ and the output of the delay unit 32-$i$ are respectively the average power Pi (t) of the segment of the keyword utterance shown in FIG. 7 and the average power Qi(t) of the segment in which non-sound before the keyword utterance is envisioned. As long as it is a keyword utterance, it is envisioned that the relationship Pi(t)>Qi(t) holds true. Accordingly, the weight is set such that the larger Pi (t) is than Qi(t), the larger the value is. For example, the ratio Zi(t)=Pi(t)/Qi(t) between Pi(t) and Qi(t) is obtained, a monotonically increasing function f is applied to the ratio Zi(t), Wi(t)=f (Pi(t)/Qi(t)) is calculated, and a weight Wi(t) is calculated. However, the function f is a sigmoid function or the like.

For each channel i, the weighted maximum power detection unit 34 multiplies the weight Wi(t) calculated by the weight calculation unit 33-$i$ by the power Pi (t) output by the delay unit 14-$i$, and selects the channel having the maximum power among the multiplied weighted powers as the output channel.

Regarding the other processing, it is similar to the content described in the first embodiment above.

In the third embodiment, a more accurate determination can be performed by determining the channel in which the keyword utterance is included, based on two assumptions, namely the assumption that the power of the channel in which the utterance of the keyword is included is large in the keyword utterance segment and the assumption that the utterer has not produced a word prior to the utterance of the keyword.

Fourth Embodiment

In a fourth embodiment, similarly to the third embodiment, the channel selection apparatus of the second embodiment is configured to apply a weight according to which detection is easier to a channel with a small power in the segment before the keyword utterance, and thereafter performs detection of the channel with the maximum power.

Figure 9:
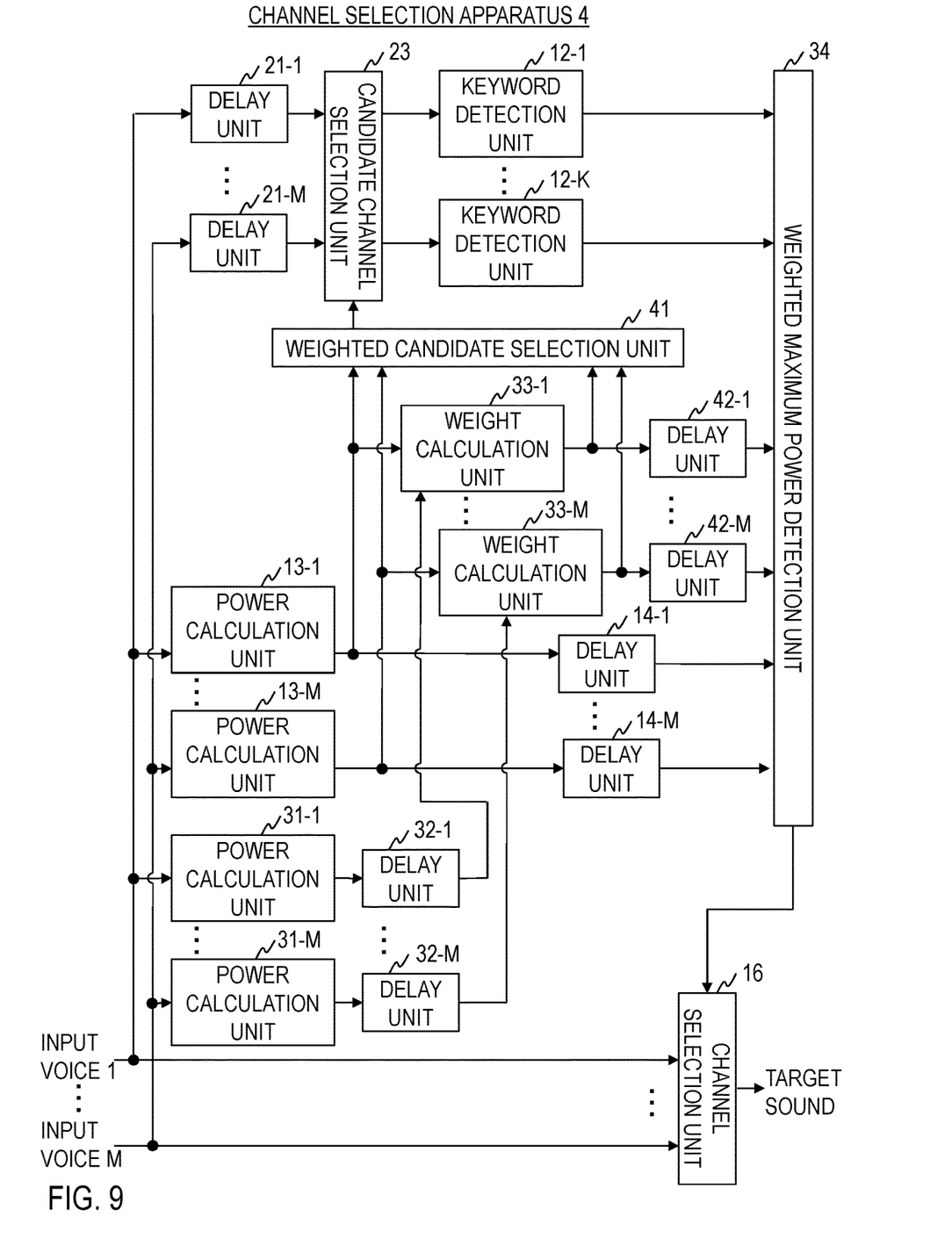
FIG. 9 is a diagram illustrating an exemplary functional configuration of a channel selection apparatus according to a fourth embodiment.

Similarly to the second embodiment, the channel selection apparatus 4 of the fourth embodiment uses voice signals of three or more channels, selects a voice signal of a channel that is suitable for the target sound to be subjected to speech recognition or the like among the channels in which an utterance of the keyword was detected, and outputs the selected voice signals. As shown in FIG. 9, in addition to the keyword detection units 12-1, . . . , and 12-K, the power calculation units 13-1, . . . , and 13-M, the delay units 14-1, . . . , and 14-M, the channel selection unit 16, the delay units 21-1, . . . , and 21-M, and the candidate channel selection unit 23 of the second embodiment, and the power calculation units 31-1, . . . , and 31-M, the delay units 32-1, . . . , and 32-M, the weight calculation units 33-1, . . . , and 33-M, and the weighted maximum power detection unit 34 of the third embodiment, the channel selection apparatus 4 further includes a weighted candidate selection unit 41, and M delay units 42-1, . . . , and 42-M.

Hereinafter, a channel selection method executed by the channel selection apparatus of the fourth embodiment will be described with a focus on differences from the channel selection method of the fourth embodiment.

For each channel i, the weighted candidate selection unit 41 multiplies a weight Wi(t) calculated by the weight calculation unit 33-$i$ by the power Pi(t) output by the power calculation unit 13-$i$, and selects K channels with large multiplied weighted powers as candidate channels. The weighted candidate selection unit 41 outputs information indicating the selected candidate channels to the candidate channel selection unit 23.

The delay units 42-$i$ ($i=1, \ldots, M$) delays the weight Wi(t) output by the weight calculation unit 33-$i$ by a time D, The time D sets the time corresponding to the detection delay of keyword detection. The delay unit 42-$i$ outputs the delayed weight Wi(t) to the weighted maximum power detection unit 34.

For each channel i, the weighted maximum power detection unit 34 multiplies the weight Wi(t) output by the delay unit 42-$i$ by the power Pi (t) output by the delay unit 14-$i$ and calculates the weighted power of each channel. When the keyword detection result output by the keyword detection unit 12-$j$ indicates that the keyword was detected, the weighted maximum power detection unit 34 selects the channel having the maximum, power among the weighted powers of the candidate channel j indicating that the keyword was detected, as the output channel.

Regarding the other processing, it is similar to the content described in the embodiments above.

Although embodiments of the present invention have been described above, a specific configuration is not limited to the embodiments, and even if a design change or the like is made without departing from the gist of the present invention when necessary, such a change is included in the scope of the present invention as a matter of course. The various kinds of processing described in the embodiments are not necessarily executed in chronological order according to order of descriptions, and may be parallelly or individually executed depending on the processing capabilities of the apparatus that executes the processing or according to the need.

Program and Recording Medium

When the various processing functions of the apparatuses described in the above embodiments are realized using a computer, the functions that the apparatuses need to have are to be described in the form of a program. A computer executes the program, and thus the various processing functions of the above apparatuses are realized on the computer.

The program that describes the contents of such processing can be recorded on a computer-readable recording medium. Any kind of computer-readable recording medium may be employed, such as a magnetic recording device, an optical disc, a magneto-optical recording medium, or a semiconductor memory.

The program is distributed by, for example, selling, transferring, or lending a portable recording medium such as a DVD or a CD-ROM on which the program is recorded. Furthermore, it is possible to employ a configuration in which the program is stored in a storage device of a server computer, and the program is distributed by the server computer transferring the program to other computers via a network.

A computer that executes such a program first stores, in a storage device thereof, the program that is recorded on a portable recording medium or that has been transferred from a server computer. Thereafter, when executing processing, the computer reads the program stored in the storage device thereof, and executes processing according to the program thus read. In another mode of execution of the program, the computer may read the program directly from a portable recording medium and execute processing according to the program. In addition, the computer may sequentially execute processing according to the received program every time the computer receives the program transferred from a server computer. Also, it is possible to employ a configuration for executing the above-described processing by using a so-called ASP (Application Service Provider) type service, which does not transfer a program from the server computer to the computer, but realizes processing functions by only making instructions to execute the program and acquiring the results. The program according to the embodiments may be information that is used by an electronic computer to perform processing, and that is similar to a program (e.g. data that is not a direct command to the computer, but has the property of defining computer processing).

Also, although the apparatus is formed by running a predetermined program on a computer in the embodiments, at least part of the content of the above processing may be realized using hardware.

REFERENCE SIGNS LIST 1, 2, 3, 4 Channel selection apparatus
9 Keyword detection apparatus
11 Addition unit
12, 91 Keyword detection unit
13, 31 Power calculation unit
14, 21, 32, 42 Delay unit
15 Maximum power detection unit
16 Channel selection unit
22 Candidate selection unit
23 Candidate channel selection unit
33 Weight calculation unit
34 Weighted maximum power detection unit
41 Weighted candidate selection unit
99 Target sound output unit

What is claimed is:

1. A channel selection apparatus comprising:
input circuitry configured to receive input voice signals of a voice captured by a plurality of microphones over a plurality of channels of input voice signals, at least two of the input voice signals including a predetermined keyword;
addition circuitry configured to add all the received input voice signals of the voice of the plurality of channels to generate a composite voice signal of one channel;
keyword detection circuitry configured to generate a keyword detection result indicating a result of detecting an utterance of the predetermined keyword from the composite voice signal;
power calculation circuitry configured to calculate first power of an input voice signal in each channel of the plurality of channels;
maximum power detection circuitry configured to, when the keyword detection result indicates that the predetermined keyword has been detected, select a channel having the maximum power among respective powers of the input voice signals of the voice over the plurality of channels of the input voice signals as an output channel;
second power calculation circuitry configured to calculate second power of an input voice signal in said each channel of the plurality of channels in a time segment obtained by tracing back a predetermined amount of time from the input voice signals;
weight calculation circuitry configured to calculate a weight having a value that increases the larger the first power output by the power calculation circuitry is than the second power output by the second power calculation circuitry,
wherein the maximum power detection circuitry is further configured to detect, as an output channel, the channel having the maximum power among the respective powers of the input voice signals of the voice over the plurality of channels, and the channel is obtained by weighting the powers of the input voice signals of the voice over the plurality of channels output by the power calculation circuitry with the weight; and
speech recognition circuitry configured to subject the output channel to speech recognition.

2. A non-transitory computer-readable recording medium on which a program recorded thereon for causing a computer to function as the channel selection apparatus according to claim 1.

3. A channel selection apparatus comprising:
input circuitry configured to receive input voice signals of a voice captured by a plurality of microphones over M channels of input voice signals, at least two of the input voice signals including a predetermined keyword;

power calculation circuitry configured to calculate first power of an input voice signal in each channel of the M channels based on input voice signals of the M channels, where M is an integer that is 3 or more;

candidate selection circuitry configured to select, as candidate channels, K channels with large powers among the channels of the input voice signals, where K is an integer that is 1 or more and less than M;

keyword detection circuitry configured to generate a keyword detection result indicating a result of detecting an utterance of the predetermined keyword based on the input voice signals of the candidate channels;

maximum power detection circuitry configured to select, as an output channel, a channel having the maximum power among respective powers of the input voice signals of the voice over the candidate channels for which the keyword detection result indicates that a keyword has been detected;

second power calculation circuitry configured to calculate second power of an input voice signal in said each channel of the plurality of channels in a time segment obtained by tracing back a predetermined amount of time from the input voice signals;

weight calculation circuitry configured to calculate a weight having a value that increases the larger the first power output by the power calculation circuitry is than the second power output by the second power calculation circuitry, wherein the candidate selection circuitry configured to select, as the candidate channels, K channels with large powers obtained by weighting the powers of the channels output by the power calculation circuitry with the weight, and the maximum power detection circuitry further configured to detect, as an output channel, the channel having the maximum power among the respective powers of the input voice signals of the voice over the plurality of channels, and the channel is obtained by weighting the powers of the input voice signals of the voice over the plurality of channels output by the power calculation circuitry with the weight; and speech recognition circuitry configured to subject the output channel to speech recognition.

4. A non-transitory computer-readable recording medium on which a program recorded thereon for causing a computer to function as the channel selection apparatus according to claim 3.

5. An apparatus for channel selection comprising a processor configured to execute operations comprising:

receiving input voice signals of a voice captured by a plurality of microphones over channels of input voice signals, at least two of the input voice signals including a predetermined keyword;

adding, by processing circuitry of a channel selection apparatus, all the received input voice signals of the voice over a plurality of channels to generate a composite voice signal of one channel;

generating, by the processing circuitry of the channel selection apparatus, a keyword detection result indicating a result of detecting an utterance of the predetermined keyword from the composite voice signal;

calculating, by the processing circuitry of the channel selection apparatus, first power of an input voice signal in each channel of the plurality of channels;

selecting, by the processing circuitry of the channel selection apparatus, as an output channel, a channel having the maximum power among respective powers of the input voice signals of the voice over the plurality of channels of input voice signals when the keyword detection result indicates that a keyword was detected to output the keyword through the selected output channel;

calculating second power of an input voice signal in said each channel of the plurality of channels in a time segment obtained by tracing back a predetermined amount of time from the input voice signals; and calculating a weight having a value that increases the larger the first power is than the second power, wherein the maximum power detection circuitry is further configured to detect, as an output channel, the channel having the maximum power among the respective powers of the input voice signals of the voice over the plurality of channels, and the channel is obtained by weighting the powers of the input voice signals of the voice over the plurality of channels; and specifying the output channel to perform speech recognition.

* * * * *